(12) United States Patent
Kuang (10) Patent No.: US 7,747,019 B2
(45) Date of Patent: Jun. 29, 2010

(54) METHODS AND SYSTEMS FOR COMMUNICATING OVER A QUANTUM CHANNEL

(75) Inventor: Randy Kuang, Kanata (CA)

(73) Assignee: Nortel Networks Limited, St-Laurent, Quebec (CA)

( * ) Notice: Subject to any disclaimer, the term of this patent is extended or adjusted under 35 U.S.C. 154(b) by 1232 days.

(21) Appl. No.: 11/298,673

(22) Filed: Dec. 12, 2005

(65) Prior Publication Data

US 2007/0071245 A1 Mar. 29, 2007

Related U.S. Application Data

(60) Provisional application No. 60/721,093, filed on Sep. 28, 2005.

(51) Int. Cl.
H04L 9/00 (2006.01)
(52) U.S. Cl. .................................. 380/263
(58) Field of Classification Search ............ 380/263, 380/256
See application file for complete search history.

(56) References Cited

U.S. PATENT DOCUMENTS

| | | | |
|---|---|---|---|
| 5,675,648 A | 10/1997 | Townsend | |
| 5,732,139 A | 3/1998 | Lo et al. | |
| 5,764,765 A | 6/1998 | Phoenix et al. | |
| 5,768,378 A | 6/1998 | Townsend et al. | |
| 5,953,421 A | 9/1999 | Townsend | |
| 6,188,768 B1 | 2/2001 | Bethune et al. | |
| 6,438,234 B1 | 8/2002 | Gisin et al. | |
| 6,678,379 B1 * | 1/2004 | Mayers et al. | 380/278 |
| 6,801,626 B1 * | 10/2004 | Nambu | 380/256 |
| 7,233,672 B2 | 6/2007 | Mitchell et al. | |
| 7,403,623 B2 * | 7/2008 | Cerf et al. | 380/278 |
| 7,570,767 B2 | 8/2009 | Lo | |

(Continued)

FOREIGN PATENT DOCUMENTS

WO PCT/CA2006/000644 8/2006

(Continued)

OTHER PUBLICATIONS

Arda, A Quantum Information Science and Technology Roadmap, Jul. 19, 2004, 17 pages, Version 1.0, United States of Amercia, http://qist.lanl.gov.

(Continued)

*Primary Examiner*—Matthew B Smithers (57) ABSTRACT

Alice generates a sequence of key bits forming an initial cryptographic key. Alice then uses the sequence of key bits and a sequence of cipher bits to control respective control parameters of a quantum encoding process applied to a sequence of quantum pulses, where the sequence of cipher bits used is known to Bob. Alice then releases the encoded pulses towards Bob over a quantum channel. Bob uses the previously agreed-upon sequence of cipher bits to control a control parameter, such as the quantum basis, of a quantum detection process applied to the pulses received from Alice, thus producing a detection outcome for each received pulse. Bob then derives a final cryptographic key from the detection outcomes. Because the cipher bits used to select the quantum bases used by both Alice and Bob are known by both parties, the method allows the final cryptographic key to be distributed with full basis alignment compared to 50% for BB84, thus allowing efficient quantum key distribution over multiple hops.

30 Claims, 7 Drawing Sheets

U.S. PATENT DOCUMENTS

| | | | |
|---|---|---|---|
| 2002/0097874 | A1 | 7/2002 | Foden et al. |
| 2003/0169880 | A1* | 9/2003 | Nambu et al. ............... 380/256 |
| 2004/0161109 | A1 | 8/2004 | Trifonov |
| 2004/0184603 | A1* | 9/2004 | Pearson et al. ............... 380/28 |
| 2004/0190725 | A1 | 9/2004 | Yuan et al. |
| 2005/0135627 | A1 | 6/2005 | Zavriyev et al. |
| 2005/0190922 | A1 | 9/2005 | LaGasse |
| 2005/0286723 | A1 | 12/2005 | Vig et al. |
| 2006/0222180 | A1 | 10/2006 | Elliott |
| 2006/0239463 | A1 | 10/2006 | Young |
| 2006/0256966 | A1* | 11/2006 | Kuang et al. ............... 380/256 |
| 2008/0037998 | A1* | 2/2008 | Zhengfu et al. ............. 398/184 |
| 2008/0144833 | A1* | 6/2008 | Matsumoto ................ 380/278 |

FOREIGN PATENT DOCUMENTS

| | | |
|---|---|---|
| WO | PCT/CA2006/000645 | 8/2006 |
| WO | PCT/CA2006/000646 | 8/2006 |
| WO | PCT/CA2006/000647 | 8/2006 |

OTHER PUBLICATIONS

ID Quantique SA, Understanding Quantum Cryptography, Apr. 2005, 12 pages, Version 1.0, Switzerland.

James Ford, Quantum Cryptography Tutorial, May 16, 2005, 5 pages, http://www.cs.dartmouth.edu/~jford/crypto.html.

BB84 Demo, May 16, 2005, 3 pages, http://monet.mercersburg.edu/henle/bb84/demo.php.

Karen Kelly, Quantum decoys foil code-breaking attempts, Jul. 18, 2005, 3 pages, Univeristy of Toronto, Canada, http://www.news.utoronto.ca/bin6/050718-1521.asp.

Chris Muktar, Modern Quantum Cryptography, 11 pages, Department of Theoretical Physics, University of Manchester, United Kingdom.

Office Action mailed on Aug. 27, 2009 in connection with U.S. Appl. No. 11/481,906.

Office Action mailed on Oct. 29, 2009 in connection with U.S. Appl. No. 11/481,826.

* cited by examiner

METHODS AND SYSTEMS FOR COMMUNICATING OVER A QUANTUM CHANNEL

CROSS-REFERENCE TO RELATED APPLICATION

The present invention claims the benefit under 35 USC §119(e) of prior U.S. provisional patent application Ser. No. 60/721,093 to Randy Kuang, filed on Sep. 28, 2005, hereby incorporated by reference herein.

FIELD OF THE INVENTION

The present invention relates generally to communications and, more particularly, to methods and systems for communicating over a quantum channel.

BACKGROUND

Advances in the field of quantum cryptography have led to the development of methodologies for the secure distribution of a cryptographic key over a quantum channel. This is known as "quantum key distribution" or QKD. Specifically, by exploiting the properties of a quantum channel, one can devise protocols that allow two communicating parties (referred to in cryptography parlance as "Alice" and "Bob") to detect when the quantum channel has been intercepted or otherwise tampered with by an intermediate party (referred to as "Eve"). Thus, as long as no such interception or tampering has been detected, Alice and Bob can rest assured that their cryptographic key will have been distributed in complete security over the quantum channel. The cryptographic key is then used by Alice and Bob in subsequent encryption (over a classical channel) of possibly larger amounts of information requiring secure transmission.

A specific example of a quantum channel is an optical fiber, which transports "pulses", each of which contains zero or more photons. However, when transmitting photons over long distances, they may become so severely attenuated as to render them undetectable by Bob's receiver. Hence, when performing QKD over long distances, it becomes necessary to install repeaters every several kilometers or so, whose function it is to detect photons transmitted by a previous "hop" and to re-transmit them to the next hop. Several types of repeater architectures have been devised to meet the needs of long-haul QKD.

A first type of repeater architecture utilizes conventional quantum reception and transmission devices at each hop, while relying on the so-called BB84 protocol for communication over the quantum channel spanning between adjacent hops. For details about the BB84 protocol, the reader is referred to C. H. Bennett and G. Brassard, "Quantum Cryptography: Public Key Distribution and Coin Tossing", *Proceedings of IEEE International Conference on Computers Systems and Signal Processing*, Bangalore, India, December 1984, pp. 175-179, hereby incorporated by reference herein.

Unfortunately, by virtue of the base mismatch phenomenon that is inherent to the BB84 protocol, an average of 50% of the data that is transmitted from one hop to the next is forfeited at that next hop. As a result, with N repeaters placed between Alice and Bob, the loss exclusively attributable to use of the BB84 protocol between Alice and Bob will be $1/2^{(N+1)}$. By way of example, a system that has three repeaters (i.e., four hops) and which uses the BB84 protocol between hops will allow no more than about 6 percent of an original amount of data to be transmitted securely from Alice to Bob. Clearly, this degree of loss is undesirable and becomes even more so as the number of hops grows.

A second type of repeater architecture contemplates the use of devices with a so-called "quantum memory", which attempts to capture photons without altering their state (i.e., without detecting them). The photons captured at one hop are then re-transmitted to the next hop by ejecting them from the quantum memory. However, this technology is currently still considered experimental and not commercially viable, as its sensitivity to extraneous factors as well as its ability to function at high data rates has not yet been fully investigated. Moreover, it is an expensive technology and thus, overall, quantum memory devices are not considered to provide a practical solution for long-haul QKD.

Therefore, a need clearly exists in the industry for an improvement over existing methods and systems used for communicating over a quantum channel.

SUMMARY OF THE INVENTION

In accordance with a first broad aspect, the present invention seeks to provide a method for quantum key distribution between a first node and a second node. The method includes, by the first node: (I) generating a sequence of key bits forming an initial cryptographic key; (II) using the sequence of key bits and a sequence of cipher bits to control respective control parameters of a quantum encoding process applied to a sequence of quantum pulses, the sequence of cipher bits being known to the second node; and (III) releasing the encoded quantum pulses towards the second node over a quantum channel. The method further includes, by the second node, (I) using the sequence of cipher bits to control a control parameter of a quantum detection process applied to the encoded quantum pulses received from the first node, the quantum detection process producing a detection outcome for each received encoded quantum pulse; and (II) deriving a final cryptographic key from the detection outcomes.

In accordance with a second broad aspect, the present invention seeks to provide a system for quantum key distribution. The system includes a first node and a second node. The first node includes (I) a quantum source for generating a sequence of quantum pulses; (II) a quantum encoding module for applying a quantum encoding process to the sequence of quantum pulses, thereby to produce a sequence of encoded quantum pulses released towards the second node over a quantum channel, the quantum encoding process being performed on a basis of a pair of control parameters; and (III) a controller operable for generating a sequence of key bits forming an initial cryptographic key and using the sequence of key bits and a sequence of cipher bits to respectively control the pair control parameters of the quantum encoding process, the sequence of cipher bits being known to the second node. The second node includes (I) a quantum detection module for applying a quantum detection process to the encoded quantum pulses received from the first node; and (II) a controller operable for using the sequence of cipher bits to control a control parameter of the quantum detection process, the quantum detection process producing a detection outcome for each received encoded quantum pulse on a basis of the control parameter. The controller at the second node is also operable for deriving a final cryptographic key from the detection outcomes.

In accordance with a third broad aspect, the present invention seeks to provide an apparatus for participating in a key generation process with a receiving node. The apparatus includes (I) a quantum source for generating a sequence of quantum pulses, each of the quantum pulses potentially having photon content; (II) a quantum encoding module operable to apply a quantum encoding process to each of the quantum pulses to produce a sequence of encoded pulses, the quantum encoding process placing the photon content of respective ones of the quantum pulses into respective quantum states characterized by respectively associated quantum bases and respectively associated polarities; and (III) a controller operable to generate a sequence of key bits forming a cryptographic key, the controller further operable to supply the sequence of key bits and a sequence of cipher bits to the quantum encoding module, the key bits being representative of the respectively associated polarities, the cipher bits being representative of the respectively associated quantum bases, the cipher having been previously agreed upon with the receiving node. The quantum encoding module is further operable to release the sequence of encoded quantum pulses towards the receiving node over a quantum channel.

In accordance with a fourth broad aspect, the present invention seeks to provide an apparatus for participating in a key generation process with a receiving node. The apparatus comprises (I) means for generating a sequence of quantum pulses, each of the quantum pulses potentially having photon content; (II) means for applying a quantum encoding process to each of the quantum pulses to produce a sequence of encoded pulses, the quantum encoding process placing the photon content of respective ones of the quantum pulses into respective quantum states characterized by respectively associated quantum bases and respectively associated polarities; (III) means for generating a sequence of key bits forming a cryptographic key, the controller further operable to supply the sequence of key bits and a sequence of cipher bits to the quantum encoding module, the key bits being representative of the respectively associated polarities, the cipher bits being representative of the respectively associated quantum bases, the cipher having been previously agreed upon with the receiving node; and (IV) means for releasing the sequence of encoded quantum pulses towards the receiving node over a quantum channel.

In accordance with a fifth broad aspect, the present invention seeks to provide a method for participating in a key generation process with a receiving node. The method includes (I) generating a sequence of quantum pulses, each of the quantum pulses potentially having photon content; (II) applying a quantum encoding process to each of the quantum pulses to produce a sequence of encoded pulses, the quantum encoding process placing the photon content of respective ones of the quantum pulses into respective quantum states characterized by respectively associated quantum bases and respectively associated polarities; (III) generating a sequence of key bits forming a cryptographic key, the controller further operable to supply the sequence of key bits and a sequence of cipher bits to the quantum encoding module, the key bits being representative of the respectively associated polarities, the cipher bits being representative of the respectively associated quantum bases, the cipher having been previously agreed upon with the receiving node; and (IV) releasing the sequence of encoded quantum pulses towards the receiving node over a quantum channel.

In accordance with a sixth broad aspect, the present invention seeks to provide an apparatus for participating in a key generation process with a transmitting node. The apparatus includes (I) a detector for applying a quantum detection function to a sequence of quantum pulses received over a quantum channel to produce a respective plurality of detection outcomes, the quantum detection function processing respective ones of the quantum pulses with respect to respectively associated quantum bases to attempt to detect respective polarities therein, the respective polarities being represented in the detection outcomes; and (II) a controller operable to supply a sequence of cipher bits to the detector, the cipher bits being representative of the respectively associated quantum bases, the cipher having been previously agreed upon with the transmitting node. The controller is further operable to derive a cryptographic key from the detection outcomes.

In accordance with a seventh broad aspect, the present invention seeks to provide an apparatus for participating in a key generation process with a transmitting node. The apparatus includes (I) means for applying a quantum detection function to a sequence of quantum pulses received over a quantum channel to produce a respective plurality of detection outcomes, the quantum detection function processing respective ones of the quantum pulses with respect to respectively associated quantum bases to attempt to detect respective polarities therein, the respective polarities being represented in the detection outcomes; (II) means for supplying a sequence of cipher bits to the detector, the cipher bits being representative of the respectively associated quantum bases, the cipher having been previously agreed upon with the transmitting node; and (III) means for deriving a cryptographic key from the detection outcomes.

In accordance with an eighth broad aspect, the present invention seeks to provide a method for participating in a key generation process with a transmitting node. The method includes (I) applying a quantum detection function to a sequence of quantum pulses received over a quantum channel to produce a respective plurality of detection outcomes, the quantum detection function processing respective ones of the quantum pulses with respect to respectively associated quantum bases to attempt to detect respective polarities therein, the respective polarities being represented in the detection outcomes; (II) supplying a sequence of cipher bits to the detector, the cipher bits being representative of the respectively associated quantum bases, the cipher having been previously agreed upon with the transmitting node; and (III) deriving a cryptographic key from the detection outcomes.

These and other aspects and features of the present invention will now become apparent to those of ordinary skill in the art upon review of the following description of specific embodiments of the invention in conjunction with the accompanying drawings.

It is to be expressly understood that the description and drawings are only for the purpose of illustration of certain embodiments of the invention and are an aid for understanding. They are not intended to be a definition of the limits of the invention.

DETAILED DESCRIPTION OF EMBODIMENTS

Overall System

Figure 1A:
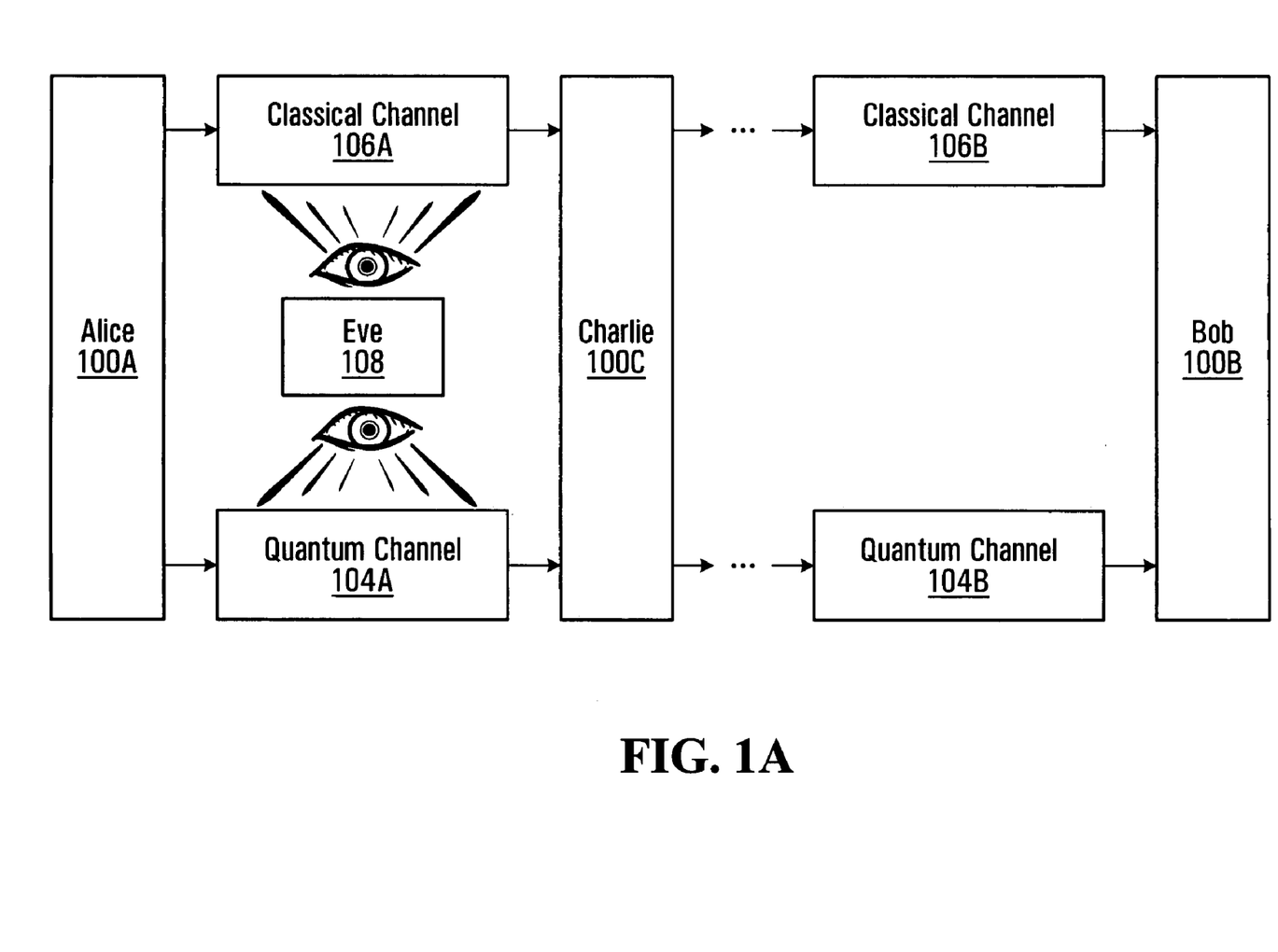
FIG. 1A is a block diagram showing a communications setup between a first node (Alice) and a second node (Bob) via an intermediate node (Charlie)

With reference to FIG. 1A, there is shown a first node (hereinafter referred to as Alice 100A) and a second node (hereinafter referred to as Bob 100B) that participate in a cryptographic key distribution process. Located between Alice 100A and Bob 100B are one or more intermediate nodes, only one of which is illustrated and referred to as Charlie 100C. It should be understood that any number of intermediate nodes, such as Charlie 100C, may be present between Alice 100A and Bob 100B. In fact, the present invention has beneficial application even in the absence of any intermediate nodes between Alice 100A and Bob 100B. In such a scenario, references to Charlie 100C in the below description may be replaced by references to Bob 100B.

Adjacent pairs of nodes communicate over a quantum channel and a classical channel. For example, in the illustrated embodiment, Alice 100A and Charlie 100C communicate over a quantum channel 104A and a classical channel 106A, while Bob 100B and the node immediately to the left of Bob 100B in FIG. 1A communicate over a quantum channel 104B and a classical channel 106B.

The classical channel 106A may be embodied as any conventional wired, wireless or optical link, or a collection of such links, which may traverse one or more networks. For its part, the quantum channel 104A may be embodied as any communication channel that is capable of transporting quanta from Alice 100A to Charlie 100C and possibly also in the reverse direction. Quanta can be defined as indivisible entities, non-limiting examples of which include quanta of light (e.g., photons) or other electromagnetic radiation, as well as electrical quanta (e.g., electrons). In a specific non-limiting example, the quantum channel 104A may be embodied as an optical waveguide such as an optical fiber. In another specific non-limiting example, the quantum channel 104A may be embodied as a wireless or free-space optical (FSO) link.

Potentially located between Alice 100A and Charlie 100C is an entity, hereinafter referred to as Eve 108, which may attempt to "eavesdrop" on the transmissions taking place over the quantum channel 104A and/or the classical channel 106A.

Figure 1B:
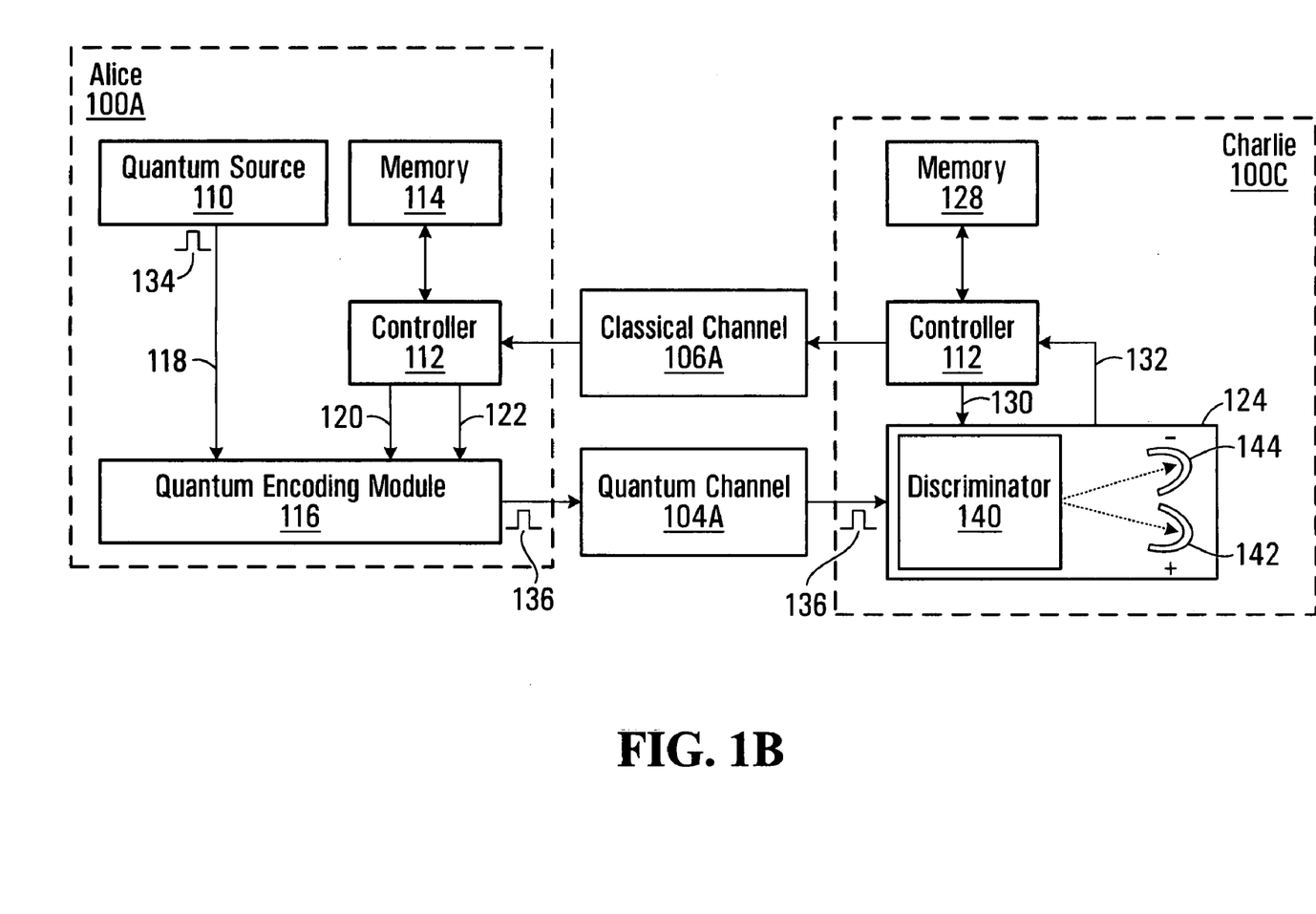
FIG. 1B is a block diagram showing the components of Alice's and Charlie's nodes, in accordance with a specific non-limiting embodiment of the present invention.

With reference now to FIG. 1B, Alice 100A comprises a quantum source 110, a controller 112 with access to a memory 114, and a quantum encoding module 116. The quantum source 110 outputs quanta (such as photons), which travel to the quantum encoding module 116 over a communication link 118, which may comprise an optical waveguide such as an optical fiber. The output of the quantum source 110 may be viewed as a sequence of pulses 134, with the number of photons in each pulse 134 being a random variable whose characteristics are set by the properties of the quantum source 110. In a non-limiting example, the quantum source 110 may comprise a laser pulse generator in combination with a controllable attenuator, which emits a potentially variable number of photons per interval of time (i.e., per pulse 134). It is noted that there is a possibility that one or more pulses 134 will not contain any photons; such a pulse is hereinafter referred to as a "vacuum pulse".

The quantum encoding module 116 is now described. In two specific non-limiting embodiments, the quantum encoding module 116 may be a polarization modulator or a phase modulator. From a functional point of view, the quantum encoding module 116 is a device that imparts a "quantum state" to the photon content (if any) of each pulse 134 received from the quantum source 110 along the communication link 118. The quantum state imparted to the photons contained in a given pulse 134 may be selected by adjusting a set of control parameters at the quantum encoding module 116. In one non-limiting example embodiment, the control parameters include a "quantum basis" and a "polarity" relative to that quantum basis. Thus, by choosing the quantum basis and the polarity relative to the chosen quantum basis, one can control the particular quantum state to be imparted to the photons in a given pulse 134.

Photons may be encoded in accordance with a variety of quantum bases, depending on the implementation of the quantum encoding module 116. In the case where the quantum encoding module 116 is a polarization modulator, example quantum bases include, e.g., rectilinear, diagonal and circular; in the case where the quantum encoding module 116 is a phase modulator, example quantum bases include, e.g., $(0, \pi)$ and $(\lambda/2, 3\pi/2)$. For its part, the polarity, which is defined relative to the chosen quantum basis, is a binary variable, taking on the values "positive" and "negative" (or "0" and "1"). By adjusting the quantum basis and the polarity at the quantum encoding module 116, the quantum state imparted by the quantum encoding module can be controlled.

Once the photons (if any) in a given pulse 134 have been imparted with the appropriate quantum state, the resultant pulses, hereinafter referred to as "encoded quantum pulses" 136, are placed by the quantum encoding module 116 onto the quantum channel 104A leading towards Charlie 100C. It is recalled that certain pulses 134 received from the quantum source 110 may be vacuum pulses. Hence, some of the encoded quantum pulses 136 output by the quantum encoding module 116 are also likely to be vacuum pulses.

The controller 112 is now described. The controller 112 may be implemented in hardware, software, control logic or a combination thereof. The controller 112 executes a key generation process for generating, in cooperation with Charlie 100C, a cryptographic key to be shared by both Alice 100A and Charlie 100C. As part of the key generation process, the controller 112 determines the quantum basis and the polarity for each pulse 134 that is processed by the quantum encoding module 116. The quantum bases and the polarities are provided to the quantum encoding module 116 via a respective set of control links 120 and 122, which may be combined into a single control link if desired. In addition, as part of the key generation process, the controller 112 communicates with Charlie 100C over the classical channel 106A. Further detail regarding the specific steps in the key generation process will be given herein below.

With continued reference to FIG. 1B, there is shown a block diagram of the functional components of Charlie 100C, including a detection module 124 and a controller 126 having access to a memory 128. The detection module 124 is coupled to the quantum channel 104A, over which it is expected that the encoded quantum pulses 136 sent by Alice 100A will be received.

The quantum channel 104A may be afflicted by efficiency problems due to loss (attenuation), dispersion and the like; however, in order not to cloud the reader's understanding of the present invention, it will be assumed that the quantum channel 104A is a loss-less, dispersion-less communication channel for transporting photons.

Thus, in the absence of Eve 108, it is assumed that the quantum channel 104A permits the photons in the encoded quantum pulses 136 to preserve their respective quantum states imparted to them by the quantum encoding module 116. Stated differently, the received quantum pulses are assumed to be delayed versions of the encoded quantum pulses 136 and hence they are denoted in FIG. 1B by the same reference numeral 136. The detection module 124 can be a conventional unit used for quantum cryptography and, in particular, for implementation of the BB84 protocol. The detection module 124 applies a quantum detection process to each received quantum pulse 136 to produce a "detection outcome" for that received quantum pulse 136.

Specifically, the quantum detection process produces a vacuum result when applied to a received quantum pulse 136 that is a vacuum pulse. In addition, the quantum detection process produces a polarity reading when applied to a received quantum pulse 136 that is not a vacuum pulse. In this case, the polarity reading will correspond to either a positive polarity or a negative polarity, relative to a quantum basis that is externally specified by the controller 126 via a control link 130. The quantum basis may thus be used as a control parameter to control the quantum detection process. Specifically, a desired pattern of quantum bases may be used in the detection of a sequence of received quantum pulses 136.

Structurally, the detection module 124 may comprise a discriminator 140 and two identical detectors referred to as a "positive polarity detector" 142 and a "negative polarity detector" 144, known to those of skill in the art. In operation, the discriminator 140 is operable to process the photon(s) in each received quantum pulse 136 with respect to the quantum basis for that pulse as identified by the controller 126 along the control link 130.

When processing a received quantum pulse 136 that is a vacuum pulse, the discriminator 140 has no photon to divert towards either detector and therefore neither the positive polarity detector 142 nor the negative polarity detector 144 will record the detection of a photon. The detection outcome for that received quantum pulse 136 is referred to as a "vacuum result".

When there is one photon in the received quantum pulse 136, the detection module 124 produces an unambiguous polarity reading. Specifically, if the quantum basis used for detection is the same as the quantum basis that makes up the quantum state of the photon, then the photon will be diverted to one or the other of the two detectors 142, 144, as a function of its actual polarity (i.e., positive or negative). In this case, the unambiguous polarity reading will be correct. However, when there is a quantum basis mismatch, the photon will be directed with roughly equal probability to either one or the other of the two detectors 142, 144, irrespective of its actual polarity. In this case, the polarity reading—although unambiguous—will be incorrect approximately half of the time.

When there is more than one photon (having the same quantum state) in the received quantum pulse 136, the detection module 124 produces a polarity reading that may be ambiguous or unambiguous. Specifically, if the quantum basis used for detection is the same as the quantum basis that makes up the quantum state of the photons in the received quantum pulse 136, then the photons will be diverted to one or the other of the two detectors 142, 144, as a function of their actual polarity (i.e., positive or negative). In this case, the polarity reading will be unambiguous and correct. However, when there is a quantum basis mismatch, each of the photons will be directed with roughly equal probability to either one or the other of the two detectors 142, 144, irrespective of the actual polarity of the photon. This causes the detection module 124 to produce, most of the time, an ambiguous polarity reading for that received quantum pulse. Half of the remainder of the time, however, the polarity reading will be unambiguous and incorrect, while the other half of the remainder of the time, the polarity reading will actually be unambiguous and correct.

Assuming that the received quantum pulse 136 is not a vacuum pulse and further assuming that the quantum basis used for detection is the same as the quantum basis that makes up the quantum state of the photon content in the received quantum pulse 136, the quantum detection process can be summarized as producing a polarity reading that is a binary value correctly reflecting the polarity of the photon content in the received quantum pulse 136.

The detection outcomes (i.e., vacuum, positive, negative or ambiguous) produced for the received quantum pulses 136 are supplied to the controller 126 via a control link 132. The controller 126, which may be implemented in hardware, software, control logic or a combination thereof, executes a key generation process for generating, in cooperation with Alice 100A, the aforementioned cryptographic key to be shared by both Alice 100A and Charlie 100C. As part of the key generation process, the controller 126 determines the quantum bases to be used by the detection module 124 and provides these via the control link 130. In addition, the controller 126 processes the detection outcomes received along the control link 132, and also communicates with Alice 100A over the classical channel 106A. Further detail regarding the specific steps in the key generation process will be given herein below.

Key Generation Process

The key generation process executed in the controllers 112 and 126 can be divided into three main phases. The first phase can be referred to as "Basis Alignment", the second phase can be referred to as "Key Distribution" and the third phase, which is optional, can be referred to as "Error Correction".

Figure 2:
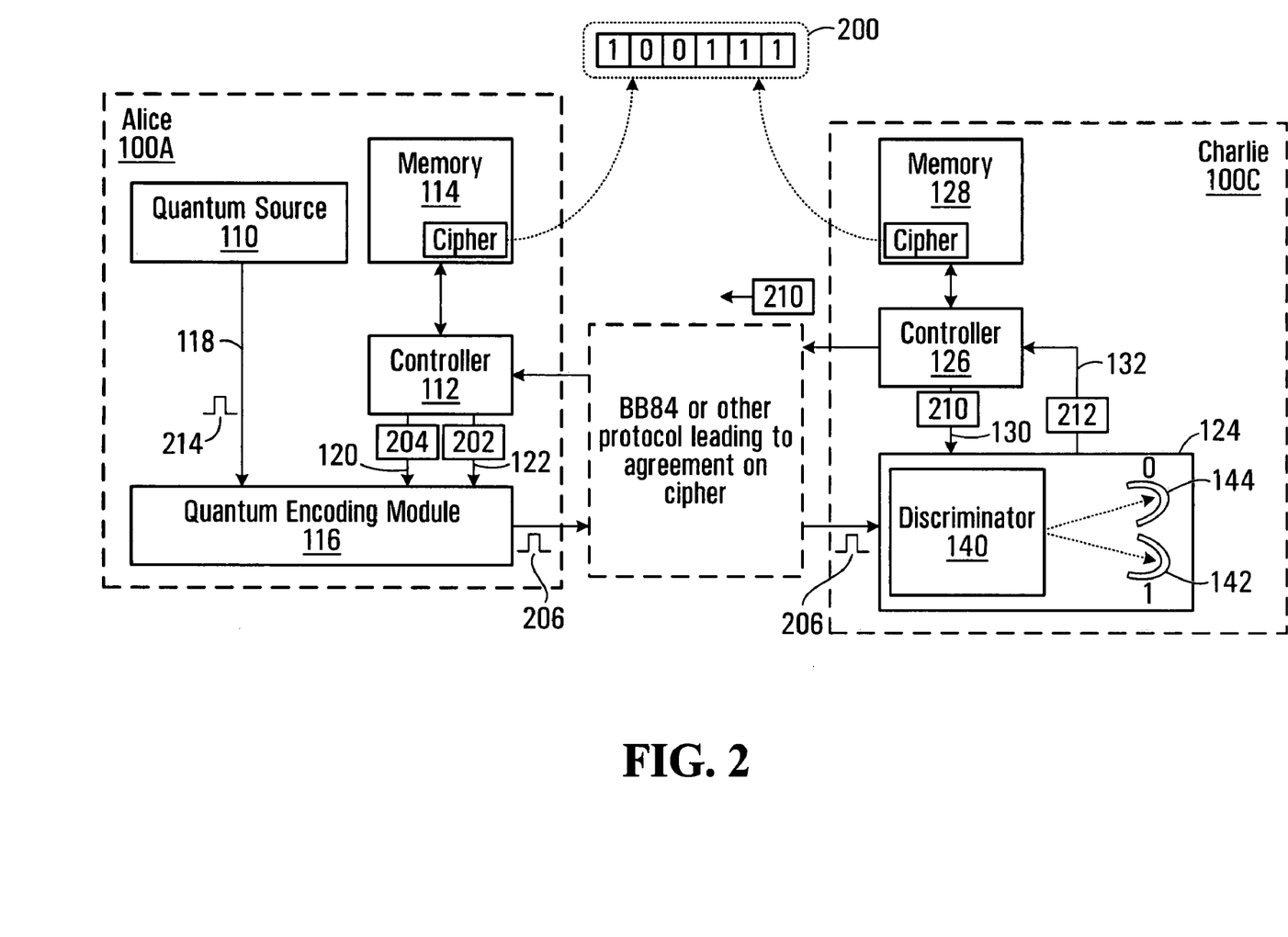
FIG. 2 is a block diagram illustrating distribution of a shared cipher by Alice and Charlie, in accordance with a specific non-limiting embodiment of the present invention.

I—Basis Alignment (FIG. 2)

Alice 100A and Charlie 100C enter into an agreement regarding a "cipher" 200 to be used in the subsequent phases of the key generation process. For maximum advantage, the cipher 200 should be generated securely. To this end, existing quantum cryptographic methodologies may be used in order to generate the cipher 200, which is stored by Alice 100A and Charlie 100C in respective memories 114 and 128. In one non-limiting example, the BB84 protocol or similar may be used to generate the cipher 200, since this can guarantee security. The broad strokes of the BB84 protocol in the context of generation of the cipher 200 are now described for the benefit of the reader.

Alice's controller 112 begins by generating an initial binary code unknown to Charlie 100C. The bit value of each bit in the initial binary code is translated into a polarity, resulting in a transmit polarity pattern 202. In addition, the controller 112 randomly chooses a quantum basis from the set of "α" and "β" to correspond to each bit in the initial binary code, where α and β are selected from among rectilinear, diagonal and circular in the case of polarization encoding bases, or from among $(0, \pi)$ and $(\pi/2, 3\pi/2)$ in the case of phase encoding bases. This results in a transmit quantum basis pattern 204, which is provided along with the transmit polarity pattern 202 to the quantum encoding module 116 via the control links 120 and 122, respectively. Each quantum basis in the transmit quantum basis pattern 204 and the corresponding polarity in the transmit polarity pattern 202 define a quantum state to be imparted by the quantum encoding module 116 to the photon content of a corresponding pulse 214 received from the quantum source 110 via the control link 118.

The resultant pulses generated by the quantum encoding module 116, referred to as "encoded quantum pulses" and denoted by the reference numeral 206, are sent over the quantum channel 104A to Charlie 100C. Charlie's controller 126 then randomly chooses a quantum basis, from among the aforementioned set of α and β, to correspond to each of the received quantum pulses 206. The selected quantum bases are provided to the detection module 124, which produces a detection outcome for each received quantum pulse 206. Stated differently, the controller 126 provides a receive quantum basis pattern 210 to the detection module 124, which produces a stream of detection outcomes 212. The detection outcomes 212 are fed to the controller 128 over the control link 132.

Next, Charlie 100C announces to Alice 100A the receive quantum basis pattern 210, without revealing the detection outcomes 212. Specifically, the controller 126 may communicate the receive quantum basis pattern 210 via the classical channel 106B. Upon receipt of the receive quantum basis pattern 210 from Charlie 100C, Alice 100A compares it with the transmit quantum basis pattern 204 to determine the positions where there has been a quantum basis mismatch.

It is noted that because Charlie's quantum basis selection was performed at random from the set of α and β, it is the case that for approximately 50% of the received quantum pulses 206, the quantum base used for detection will match the corresponding quantum base used by Alice 100A to encode the photon content of the associated transmit pulse 206. However, the other 50% of the time, there will be a "quantum basis mismatch", i.e., the quantum base used for detection will not match the corresponding quantum base used by Alice 100A to encode the photon content of the associated transmit pulse 206. Alice's controller 112 deletes from the initial binary code those bits which correspond to positions in the transmit quantum basis pattern 204 where there has been a quantum basis mismatch. The controller 112 assembles the remaining bits of the initial binary code into a "pre-cipher" for Alice 100A.

Additionally, Alice 100A informs Charlie 100C of the positions in the receive quantum basis pattern 210 where there has been a quantum basis mismatch. This allows Charlie 100C to similarly delete from the stream of detection outcomes 212 those detection outcomes which correspond to positions in the receive quantum basis pattern 210 where there has been a quantum basis mismatch. The remaining detection outcomes 212 form a pre-cipher for Charlie 100C. It can thus be concluded that Charlie's pre-cipher will have been based on the correct quantum basis and hence will be the same as Alice's pre-cipher, but only in those bit positions for which the corresponding received quantum pulse 206 was populated by a photon. For vacuum pulses, the detection outcome will be a vacuum result, and hence one final step needs to be performed.

Specifically, both Alice's and Charlie's controllers 112, 126 reduce the pre-cipher to the cipher 200 by accounting for the vacuum pulses. This can be achieved in a variety of ways, such as by simply deleting the bits corresponding to vacuum pulses. In order for Alice 100A to learn the bit positions of the vacuum pulses, this information can be provided by Charlie 100C either in conjunction with informing Alice 100A of the receive quantum basis pattern 210 or in a separate step.

The cipher 200, which has been agreed to and is now known by both Alice 100A and Charlie 100C, can be stored in the respective memory 114, 128. In the example illustrated in FIG. 2, the cipher 200 has the following value: 100111. Those skilled in the art will appreciate that other techniques based on error correction and privacy amplification can be used to reduce Alice's and Charlie's pre-ciphers to result in the cipher 200, which is shared by Alice and Charlie.

While the above description gives an overview of how the BB84 protocol may be used to generate the cipher 200, it should be understood that other methods, whether conventionally known or not, may be used to generate the cipher 200 in a secure manner. The only requirement is that both Alice 100A and Charlie 100C become aware of the same cipher 200. For example, those skilled in the art will appreciate that one may use the methods described in co-pending U.S. patent application Ser. No. 11/235,134 to Randy Kuang et al., filed on Sep. 27, 2005, assigned to the assignee of the present invention, and herein incorporated by reference herein.

Figure 3:
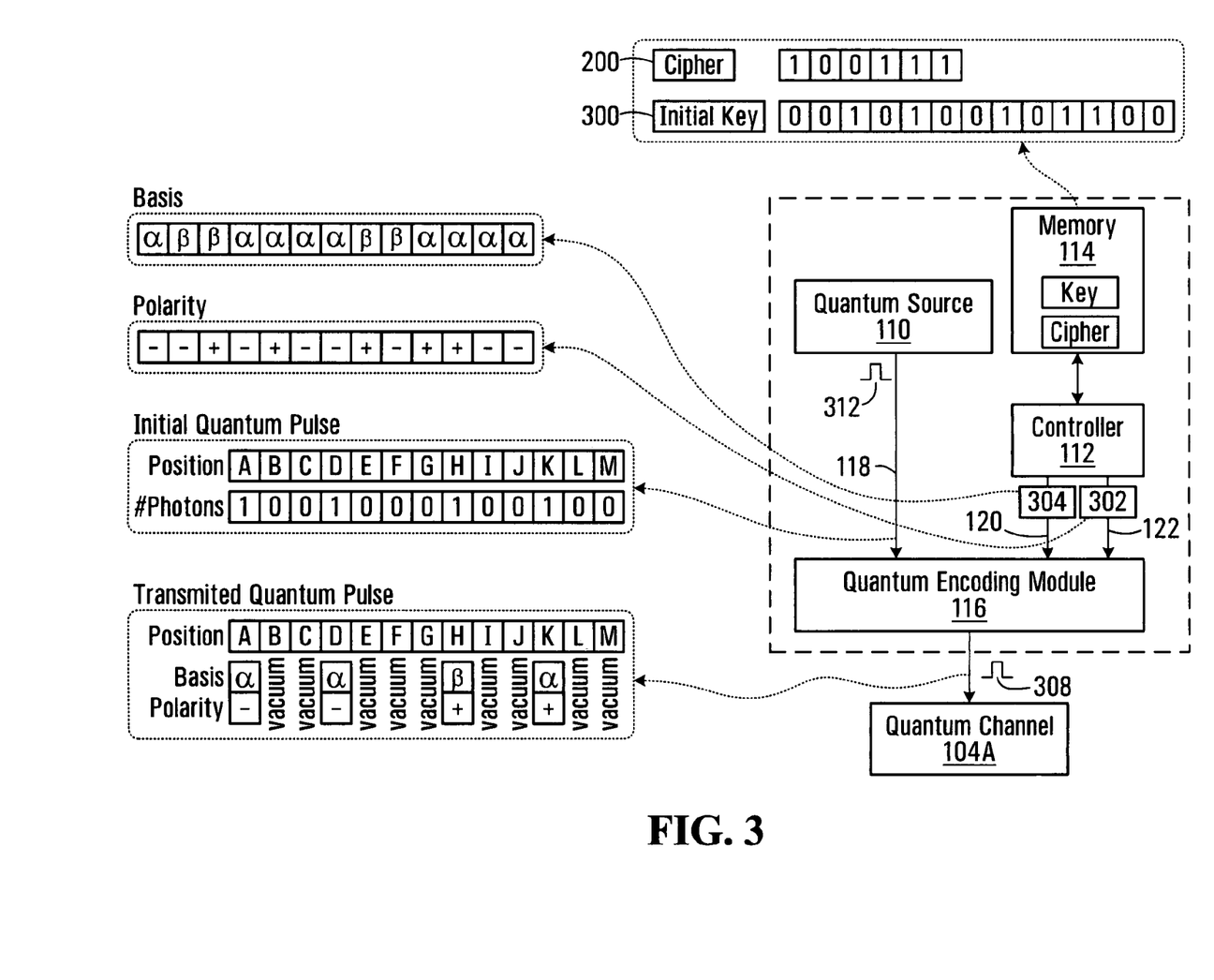
FIG. 3 depicts various steps leading to the generation of quantum pulses by Alice, in accordance with a specific non-limiting embodiment of the present invention.
Figure 4:
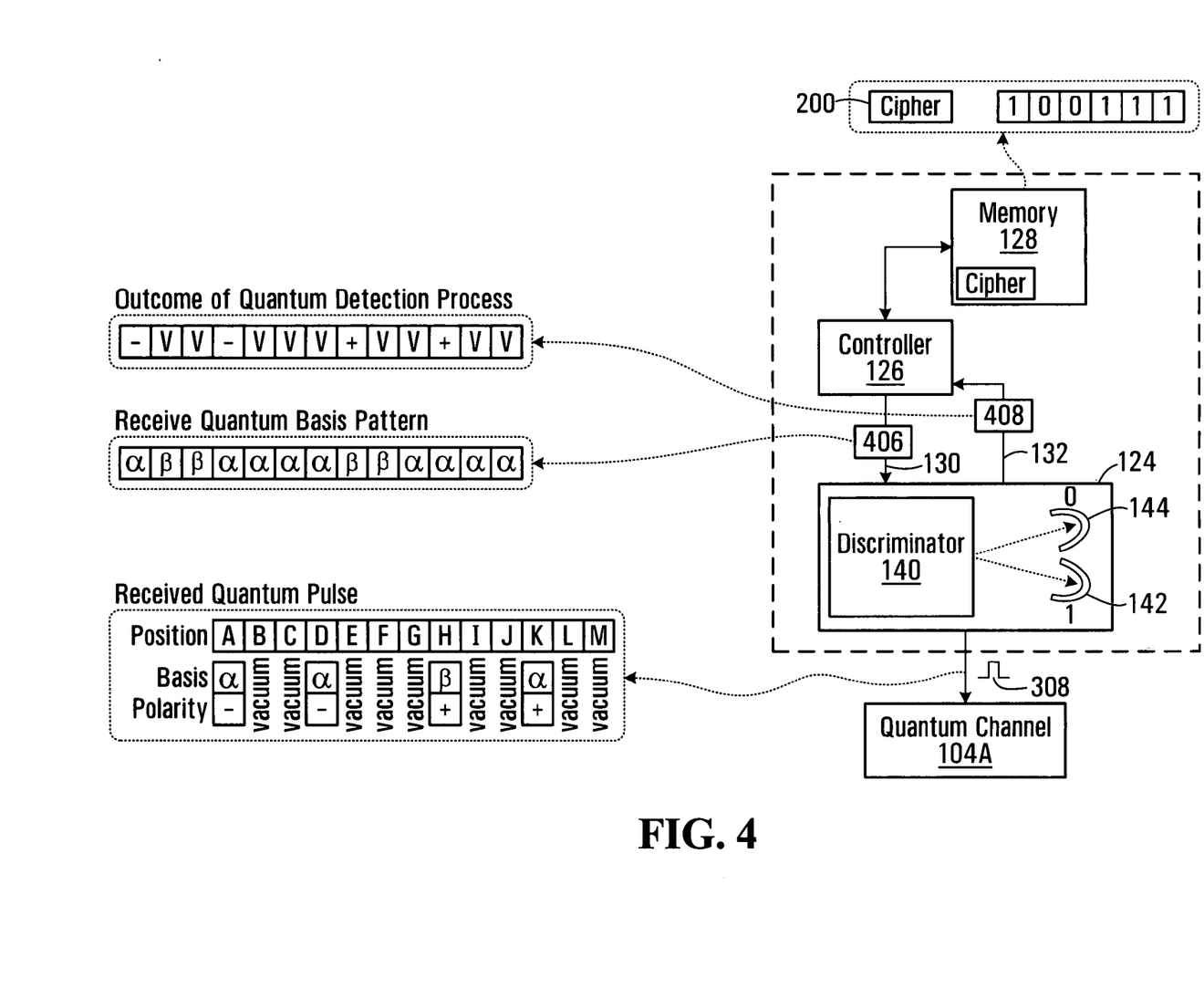
FIG. 4 depicts various steps leading to the generation of detection outcomes by Charlie, based on the processing of quantum pulses received from Alice, in accordance with a specific non-limiting embodiment of the present invention.

II—Key Distribution (FIGS. 3 and 4)

Having thus agreed on the cipher 200, Alice's controller 112 then executes the following steps, now described with reference first to FIG. 3. Specifically, the controller 112 begins by generating a sequence of key bits forming an initial cryptographic key 300 that is unknown to Charlie 100C. The initial cryptographic key 300 will morph into a shared cryptographic key used by Alice 100A and Charlie 100C (and Bob 100B) to encrypt larger amounts of data over the classical channel 106A. The initial cryptographic key 300 is stored in the memory 114. In the specific non-limiting embodiment illustrated in FIG. 3, the initial cryptographic key 300 has the following value: 0010100101100.

The controller 112 uses the bits in the key 300 and the cipher 200 to control respective control parameters of the quantum encoding process executed by the quantum encoding module 116 on the quantum pulses 312 received from the quantum source 110. Specifically, the bit value of each bit in the key 300 is translated into a polarity (say, positive + for a bit value of "1" and negative − for a bit value of "0"), resulting in a transmit polarity pattern 302. In the embodiment illustrated in FIG. 3, based on the above-mentioned translation of bit values to polarities, the transmit polarity pattern 302 will be: −, −, +, −, +, −, −, +, −, +, +, −, −.

In addition, the controller 112 selects a quantum basis from the aforementioned set of α and β as a function of the bit value of a corresponding bit in the cipher 200. For example, a cipher bit having a bit value of "1" may result in a selection of quantum basis α, while a cipher bit having a bit value of "0" may result in a selection of quantum basis β. This forms a transmit quantum basis pattern 304, which should be at least as long as the initial cryptographic key 300, even if the cipher 200 is shorter than the initial cryptographic key 300. This can be achieved by considering the cipher 200 as having been placed into a circular buffer. Based on such a circular buffer function, with the cipher 200 having a value of 100111, the transmit quantum basis pattern 304 will be: αββααααβ-βαααα. Of course, other functions are within the purview of those skilled in the art, the only requirement being that whatever function Alice 100A uses to expand the cipher 200 beyond its original size, this same function be known to Charlie 100C.

By way of specific non-limiting example, thirteen quantum pulses 312 denoted A through M are shown in FIG. 3, one pulse for each bit in the initial cryptographic key 300. Thus, pulse A corresponds to the first key bit, pulse B corresponds to the second key bit, and so on, with pulse M corresponding to the thirteenth key bit. In addition, each of the thirteen quantum pulses 312 is associated with a corresponding cipher bit. Given that the cipher 200 might not have the exact same number of bits as the initial cryptographic key 300, various ways of associating the quantum pulses 312 and the cipher bits can be provided. For example, in the illustrated embodiment, the cipher 200 is viewed as having been placed into a circular buffer, which causes pulses A through F to be associated with the first through the sixth cipher bits, respectively, pulses G through L to be similarly associated with the first through the sixth cipher bits, respectively, and pulse M to be associated with first cipher bit again.

For the benefit of the reader, the photon content of each of the thirteen pulses is also shown in FIG. 3. Specifically, pulses A, D, H and K each contain one photon, while the other pulses (B, C, E, F, G, I, J, L and M) are vacuum pulses. However, Alice 100A does not know at this stage which of the quantum pulses 312 generated by the quantum source 110 are vacuum pulses.

The transmit quantum basis pattern 304 and the transmit polarity pattern 302 are provided to the quantum encoding module 116 via the control links 120 and 122, respectively. Each quantum basis in the transmit quantum basis pattern 304 and a corresponding polarity in the transmit polarity pattern 302 together define a quantum state to be imparted by the quantum encoding module 116 to the photon content of a corresponding quantum pulse 312 received from the quantum source 110 via the control link 118.

The effect of the quantum encoding module 116 is to impart to the photon content of each of the quantum pulses 312 received from the quantum source 110 the quantum state defined by the corresponding quantum basis in the transmit quantum basis pattern 304 and the corresponding polarity in the transmit polarity pattern 302. The result is a sequence of encoded quantum pulses 308, which in the illustrated embodiment are denoted A through M, to symbolize their relationship with the quantum pulses 312. In the specific example illustrated, encoded quantum pulses A and D will have a quantum state defined by quantum basis $\alpha$ and a negative polarity, transmit pulse H will have a quantum state defined by quantum basis $\beta$ and a positive polarity, transmit pulse number K will have a quantum state defined by quantum base $\alpha$ and a positive polarity and, unbeknownst to Alice 100A, transmit pulses numbers B, C, E, F, G, I, J, L and M will remain vacuum pulses. The resultant encoded quantum pulses 308 are sent to Charlie 100C over the quantum channel 104A.

With reference now to FIG. 4, Charlie's controller 126 executes the following steps upon receipt of the encoded quantum pulses 308 that were emitted by Alice 100A. It is recalled that in the present non-limiting example, there were thirteen encoded quantum pulses 308 denoted A through M.

Due to the loss-less, dispersion-less nature of the quantum channel 104A, but unbeknownst to Charlie 100C, received quantum pulses A and D will have a quantum state defined by quantum basis $\alpha$ and a negative polarity, received quantum pulse H will have a quantum state defined by quantum basis $\beta$ and a positive polarity, received quantum pulse K will have a quantum state defined by quantum base $\alpha$ and a positive polarity, and received quantum pulses B, C, E, F, G, I, J, L and M will be vacuum pulses.

Now, relying on the cipher 200 previously determined during the Basis Alignment phase, Charlie 100C is capable of replicating Alice's transmit quantum basis pattern 304. Specifically, the controller 126 selects a quantum basis from the aforementioned set of $\alpha$ and $\beta$ as a function of the bit value of a corresponding bit in the cipher 200. This forms a receive quantum basis pattern 406, which matches the transmit quantum basis pattern 304. Where the cipher 200 is shorter than the expected number of bits in the key being distributed by Alice 100A, the cipher 200 may need to be expanded beyond its original size. As mentioned above, it is assumed that the function for doing this (e.g., placing the cipher 200 in a circular buffer) will be known beforehand by the controller 126. Also, it is assumed the overall length of the initial cryptographic key 300 (which, in some embodiments, translates into the number of times that the cipher 200 fits into the key 300) can be learned or pre-configured.

Consider, as before, that a cipher bit having a bit value of "1" results in selection of quantum basis $\alpha$, while a cipher bit having a bit value of "0" results in a selection of quantum basis $\beta$. Based on this relationship, and assuming that the cipher 200 has a value of 100111, the receive quantum basis pattern 406 of length thirteen (corresponding to the thirteen received quantum pulses 308 denoted A through M) will be: $\alpha\beta\beta\alpha\alpha\alpha\beta\beta\alpha\alpha\alpha\alpha$. It is noted that there is a 100% match between the transmit quantum basis pattern 304 and the receive quantum basis pattern 406.

The receive quantum basis pattern 406 is provided to the detection module 124 via the control link 130. The detection module 124 applies a quantum detection process to the received quantum pulses 308, resulting in the production of a stream of detection outcomes 408 for each of the received quantum pulses 308. For a received quantum pulse 308 that is a vacuum pulse, the detection outcome 408 is "vacuum" (or denoted "V" for short in FIG. 4), whereas for a received quantum pulse 308 that is not a vacuum pulse, the detection outcome is a polarity reading that reflects whether the photon content in that received quantum pulse was positive ("+") or negative ("−"), assuming that the correct quantum basis was used. The detection outcomes 408 are supplied to the controller 126 via the control link 132.

In the illustrated embodiment, it will be seen that the detection outcomes 408 for the thirteen received quantum pulses 308 are: −, V, V, −, V, V, V, +, V, V, +, V, V. It is observed that the polarity reading for the non-vacuum pulses is unambiguous and correct due to the fact that there is no quantum basis mismatch between Alice 100A and Charlie 100C. That is to say, the correct quantum basis is always used by the detection module 124, and there is no need to consider the alternative scenario where a potentially ambiguous or incorrect detection outcome would have been produced. As a result, a greater number of key bits sent by Alice 100A are correctly received by Charlie 100C.

At this point, had there been no vacuum pulses among the received quantum pulses 308, the detection outcomes 408 produced by the detection module 124 would all be correct polarity readings and hence it would be possible for the controller 126 to reconstruct the initial cryptographic key 300 flawlessly. No further communication would be needed between Charlie 100C and Alice 100A, as they each would now have knowledge of the same cryptographic key, namely the initial cryptographic key 300, and could begin utilizing it to encrypt communications, e.g., over the classical channel 106A.

However, if there are vacuum pulses among the received quantum pulses 308 (such as is the case in the illustrated embodiment), Charlie's efforts to reconstruct the initial cryptographic key 300 will be in vain and, moreover, Alice 100A will be unaware of this fact. Hence, Alice's and Charlie's respective controllers 112, 126 may proceed to the third phase (i.e., Error Correction), which will now be described. Again, it should be emphasized that the following phase can be omitted, particularly if the occurrence of vacuum pulses is considered negligible.

III—Error Correction (FIGS. 5 and 6)—Option A

Figure 5:
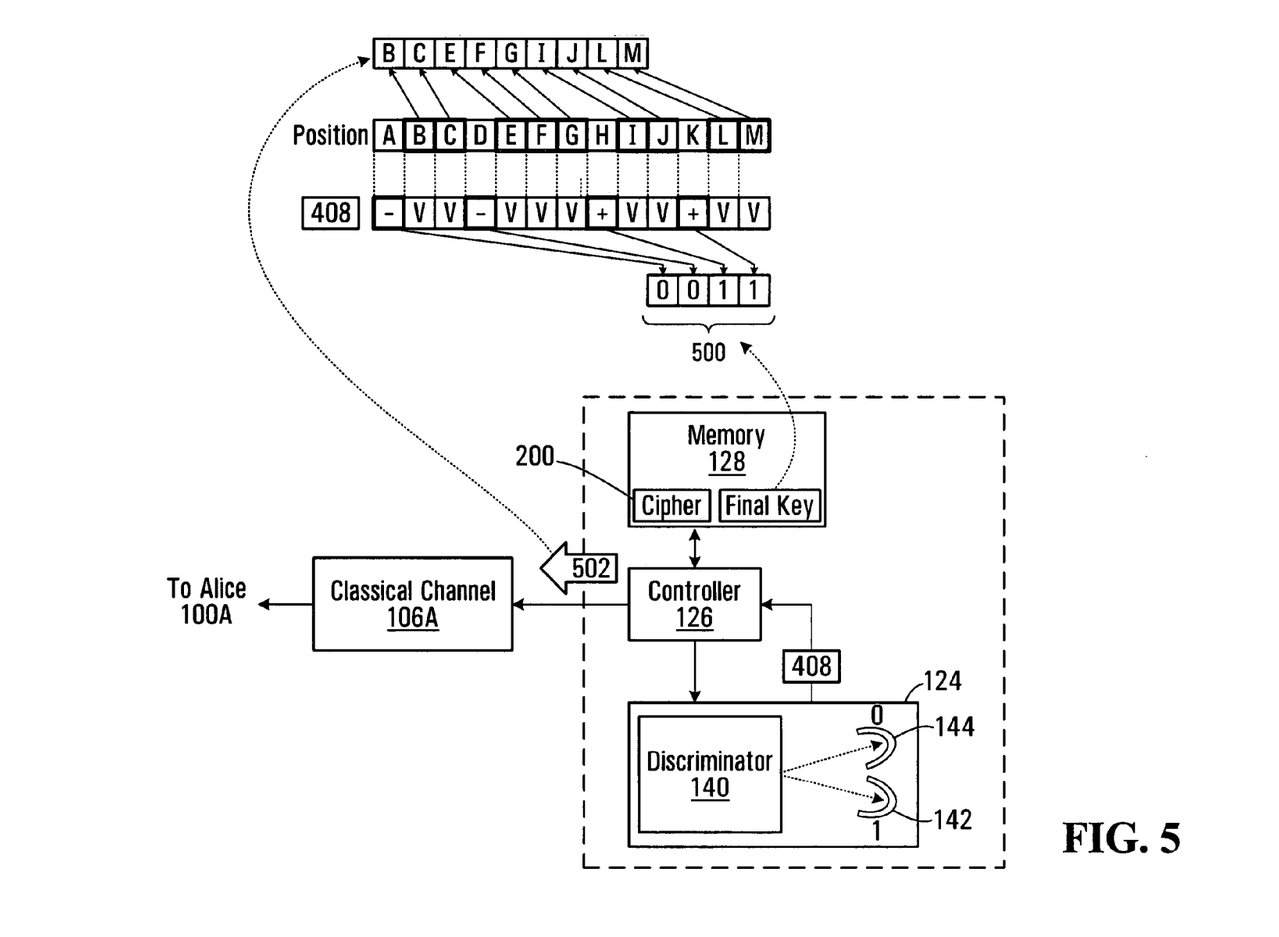
FIG. 5 depicts the creation of a shifted key by Charlie, based on the sequence of detection outcomes, in accordance with a specific non-limiting embodiment of the present invention.

In a first option, now described with reference to FIG. 5, Charlie's controller 126 collapses the detection outcomes 408 into a shifted key, which can be referred to as a final cryptographic key 500 for Charlie 100C. Quite simply, the detection outcomes 408 corresponding to vacuum pulses are deleted, although their positions are recorded. Thus, Charlie's final cryptographic key 500 will comprise a concatenation of bit values corresponding to the detection outcomes 408 obtained for the received quantum pulses 308 that are not vacuum pulses. Charlie's final cryptographic key 500 is stored in the memory 128 for future use by Charlie 100C.

In order to allow Alice 100A to perform a similar function and derive an analogous final cryptographic key, Charlie's controller 126 records the positions of the detection outcomes 408 that contained a "V", i.e., that were derived from a received quantum pulse that was found to be a vacuum pulse. These positions are sent to Alice 100A, e.g., in the form of a message 502 sent over the classical channel 106A. Equivalently, the message 502 may contain the positions of the detection outcomes that did not contain a "V" but contained a polarity reading instead.

Figure 6:
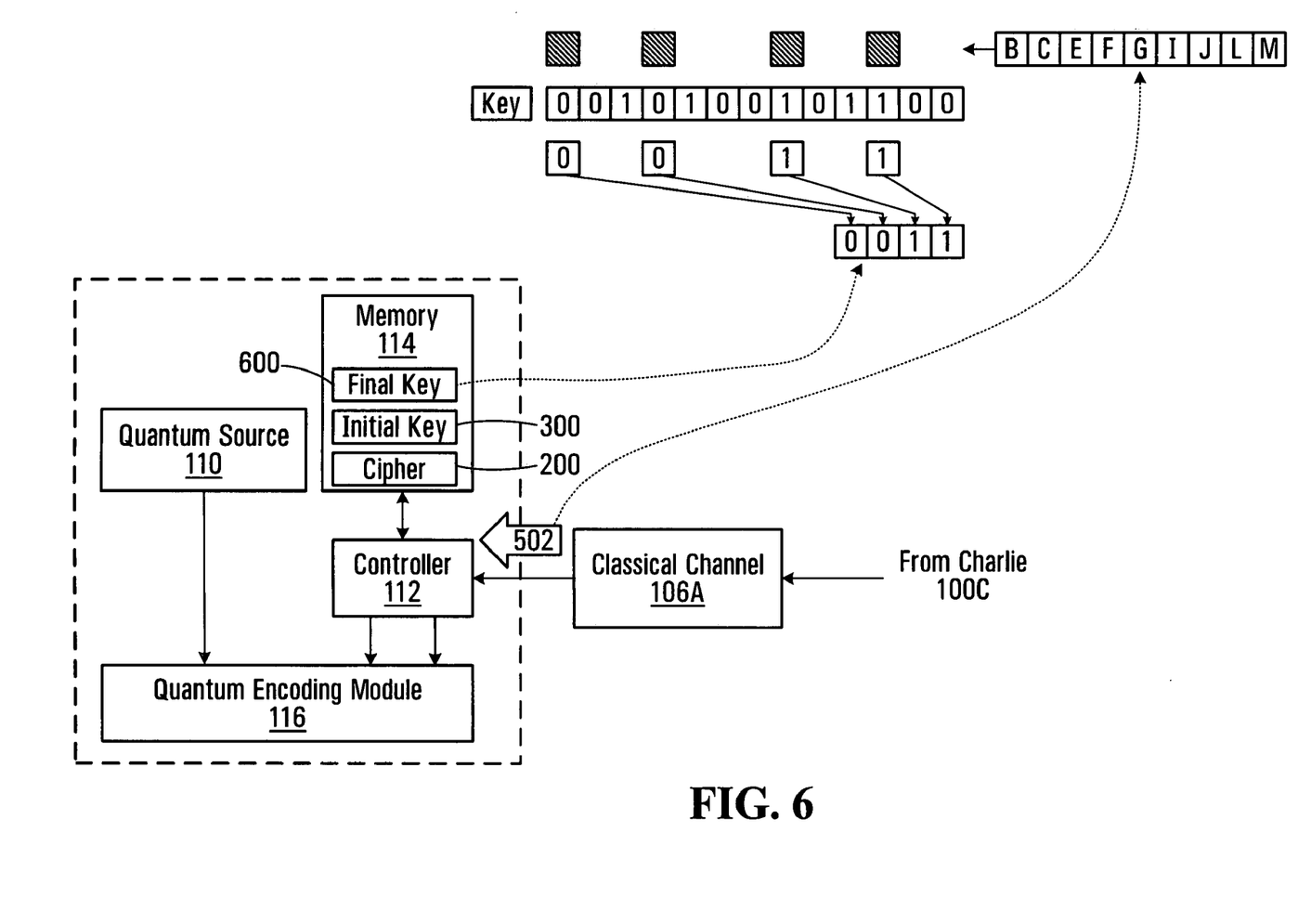
FIG. 6 depicts the generation by Alice of the same shifted key that was created by Charlie.

Alice's controller 112 then receives Charlie's message 502. Referring now to FIG. 6, the message 502 is interpreted as identifying the bit positions in the initial cryptographic key 300 that are to be removed from consideration (or kept, depending on the implementation). As a result, the initial cryptographic key 300 is appropriately tailored, resulting in a shifted key, which can be referred to as Alice's final cryptographic key 600. Alice's final cryptographic key 600, which is identical to Charlie's final cryptographic key 500, is stored in the memory 114.

It should be appreciated that Alice 100A and Charlie 100C may further tailor the final cryptographic keys 500, 600 as desired. For example, further error correction and privacy amplification steps may be performed as will be understood by persons skilled in the art.

III—Error Correction (FIGS. 5 and 6)—Option B

In a second possible option, rather than collapsing the detection outcomes 408 into a shifted key, Charlie's controller 126 constructs and stores in the memory 128 an incomplete version of the initial cryptographic key 300, with gaps in those bit positions corresponding to detection outcomes that contained a "V", i.e., that were derived from a received quantum pulse that was found to be a vacuum pulse. The positions of the missing bits are sent to Alice 100A, e.g., in the form of the aforementioned message 502 sent over the classical channel 106A. Equivalently, the message 502 may contain the positions of the detection outcomes that did not contain a "V" but contained a polarity reading instead.

Alice's controller 112 then receives Charlie's message 502. The message 502 is interpreted as identifying the bit positions in the initial cryptographic key 300 that are to undergo re-transmission. Such re-transmission of so-called "remainder bits" in the initial cryptographic key 300 may be done in exactly the same way as was described above, namely by using the bit values of the cipher 200 to determine the quantum basis. This same procedure is applied deterministically by Charlie 100C, allowing the initial cryptographic key 300 to be reconstructed over one or more iterations. Thus, it can be said that the cipher 200 is used recursively to re-transmit fewer and fewer vacuum pulses until Charlie 100C has completely reconstructed the initial cryptographic key 300. In this case, the final cryptographic keys 500, 600 will both match the initial cryptographic key 300.

Still further options for arriving at the final cryptographic keys 500, 600 from an incomplete version of the initial cryptographic key 300 will be apparent to those of skill in the art.

It is again emphasized that there will be no need to compensate for an incomplete version of the initial cryptographic key 300 when the number of vacuum pulses is zero or negligible. The reason why the photon density can be increased during the Key Distribution phase to reduce or eliminate the occurrence of vacuum pulses without compromising security will be apparent from the following.

Firstly, considering the Basis Alignment phase, if the BB84 protocol is used to distribute the cipher 200 as has been described above, then it is beneficial for most of the pulses 134 to be vacuum pulses, with every hundredth or thousandth pulse 134 containing one photon, thus leaving a minute probability of there being a pulse 134 that contains more than one photon. Hence, if Eve 108 is present on the quantum channel 104A, Eve 108 will need to detect all individual photons that are intended for Charlie 100C. In so doing, without knowledge of the quantum basis used by Alice 100A to encode the photon in a given pulse, Eve 108 does not know how to re-encode the photon so that it is sent to Charlie 100C in its original quantum state. As a result, when performing error correction with Alice 100A, Charlie 100C will notice that an incorrect result is being obtained at an increased rate. This signals to Alice 100A and/or Charlie 100C that Eve 108 is present.

Of course, it should be mentioned that the BB84 protocol or any of its variants do not need to be used during the Basis Alignment phase, since the only requirement of this phase is to distribute the cipher 200 such that Charlie 100C becomes aware of it. Those skilled in the art will appreciate that there is no limitation on the protocol used to achieve this. For example, those skilled in the art will appreciate that the methods described in the aforementioned U.S. patent application Ser. No. 11/235,134 could be used.

For its part, the Key Distribution phase does not introduce any additional security concerns, since there is no public announcement of either the transmit quantum basis pattern 304 used by Alice 100A or the receive quantum basis pattern 406 used by Charlie 100C. In other words, if Eve 108 does not know the cipher 200, then it is impossible for Eve 108 to learn the transmit quantum basis pattern 304 or the receive quantum basis pattern 406. As a result, even if Eve 108 were able to steal the photons being sent over the quantum channel 104A in a completely undetectable manner, this would still not allow her to learn Alice's and Charlie's final cryptographic keys 500, 600. From this follows the noteworthy observation that one can increase the photon density (i.e., the number of photons per pulse) during the Key Distribution phase without compromising security. By so doing, the information-carrying capacity of the pulses 134, 136, 136 is increased, since fewer of the pulses 134, 136, 136 will be vacuum pulses. Hence, the final cryptographic keys 500, 600 can be generated faster than is allowed by straightforward usage of the BB84 protocol, where the occurrence of non-vacuum pulses needs to be suppressed.

It is further recalled that after agreeing on the cipher 200, generation of Alice's and Charlie's final cryptographic keys 500, 600 occurs with 100% quantum base match between Alice 100A and Charlie 100C (ignoring the effect of vacuum pulses, which might not even occur in any significant proportion). This 100% quantum base match was made possible by deterministic parallel generation of the transmit quantum basis pattern 304 and the receive quantum basis pattern 406, after a common cipher 200 has been agreed to by Alice 100A and Charlie 100C. Analogously, this same level of performance extends to Charlie's neighbor, and so on, until Bob 100B, all the while preserving a 100% quantum base match between Alice 100A and Bob 100B. As a result, the final cryptographic keys 500, 600 can be generated faster than is allowed by straightforward usage of the BB84 protocol, where a base mismatch occurs 50% of the time.

Finally, it should be appreciated that the cipher 200 agreed upon by Alice 100A and Charlie 100C is independent of any other cipher than may be agreed upon by Charlie 100C and the node to the immediate right of Charlie 100C in FIG. 1A. Thus, Charlie 100C can agree to a different cipher with the next adjacent node, and so on, until Bob 100B and the node immediately to the left of Bob 100B in FIG. 1A agree on their own individual cipher. In this way, multiple secure Basis Alignment phases may take place in parallel, between pairs of adjacent nodes. As for the Key Distribution and Error Correction phases, these are first performed between Alice 100A and Charlie 100C, and then between Charlie 100C and the node to the right of Charlie 100C in FIG. 1A, and so on, until Bob 100B completes the Key Distribution and Error Correction phases with Bob's neighbor to the left.

While specific embodiments of the present invention have been described and illustrated, it will be apparent to those skilled in the art that numerous modifications and variations can be made without departing from the scope of the invention as defined in the appended claims.

The invention claimed is:

1. A method for quantum key distribution between a first node and a second node, comprising:
    by the first node:
        generating a sequence of key bits forming an initial cryptographic key;
        using said sequence of key bits and a sequence of cipher bits to control respective control parameters of a quantum encoding process applied to a sequence of quantum pulses, said sequence of cipher bits being known to the second node;
        releasing the encoded quantum pulses towards the second node over a quantum channel;
    by the second node:
        using said sequence of cipher bits to control a control parameter of a quantum detection process applied to the encoded quantum pulses received from the first node, the quantum detection process producing a detection outcome for each received encoded quantum pulse;
        deriving a final cryptographic key from the detection outcomes.

2. The method defined in claim 1, further comprising the first node generating said sequence of quantum pulses, each of the quantum pulses corresponding to one of said key bits and one of said cipher bits.

3. The method defined in claim 2, wherein the sequence of cipher bits is shorter than the sequence of key bits.

4. The method defined in claim 2, wherein the quantum encoding process comprises:
    imparting to each of the quantum pulses a respective quantum state having a respective quantum basis and a respective polarity, wherein for a particular one of the quantum pulses:
        the respective quantum basis is selected in dependence upon the value of the cipher bit corresponding to the particular one of the quantum pulses;
        the respective polarity is selected in dependence upon the value of the key bit corresponding to the particular one of the quantum pulses.

5. The method defined in claim 4, wherein the respective quantum basis is selected from a set of two quantum bases.

6. The method defined in claim 5, wherein the two quantum bases belong to the group consisting of rectilinear polarization, diagonal polarization and circular polarization.

7. The method defined in claim 5, wherein the two quantum bases include phase encoding basis $(0, \pi)$ and phase encoding basis $(\pi/2, 3\pi/2)$.

8. The method defined in claim 1, further comprising the second node associating the received encoded quantum pulses to the cipher bits in said cipher.

9. The method defined in claim 8, wherein the quantum detection process comprises processing said received quantum pulse with respect to a quantum basis that is selected in dependence upon the bit value of the cipher bit associated with said received quantum pulse.

10. The method defined in claim 9, wherein the quantum basis is selected from a set of two quantum bases.

11. The method defined in claim 10, wherein the two quantum bases belong to the group consisting of rectilinear polarization, diagonal polarization and circular polarization.

12. The method defined in claim 10, wherein the two quantum bases include phase encoding basis $(0, \pi)$ and phase encoding basis $(\pi/2, 3\pi/2)$.

13. The method defined in claim 9, wherein the detection outcome produced by the quantum detection process when processing a particular received quantum pulse with respect to the quantum basis selected for that received quantum pulse is:
    a vacuum result when the particular received quantum pulse has no photon content;
    a binary value when the particular received quantum pulse has photon content, the binary value reflecting a polarity of the photon content of the particular received quantum pulse.

14. The method defined in claim 13, wherein the second node deriving the final cryptographic key from the detection outcomes comprises the second node assembling those detection outcomes that are binary values into the final cryptographic key.

15. The method defined in claim 14, the method further comprising the second node identifying to the first node the received quantum pulses for which the quantum detection process has produced a vacuum result.

16. The method defined in claim 15, the method further comprising the first node deriving the final cryptographic key based on knowledge of the key bits corresponding to a quantum pulse that has been identified by the second node as a received quantum pulse for which the quantum detection process has produced a vacuum result.

17. The method defined in claim 16, wherein the first node deriving the final cryptographic key comprises:
    the first node removing from the initial cryptographic key those key bits corresponding to a quantum pulse that has been identified by the second node as a received quantum pulse for which the quantum detection process has produced a vacuum result;
    the first node assembling the remaining key bits in the initial cryptographic key into the final cryptographic key.

18. The method defined in claim 13, the detection outcomes being first detection outcomes, the method further comprising:
    by the second node:
        identifying to the first node the received quantum pulses for which the quantum detection process has produced a vacuum result, the key bits of the initial cryptographic key that correspond to a quantum pulse that has been identified by the second node as a received quantum pulse for which the quantum detection process has produced a vacuum result being hereinafter referred to as "remainder bits";

by the first node:
using said remainder bits and said sequence of cipher bits to control said respective control parameters of said quantum encoding process applied to a further sequence of quantum pulses, thereby to create second encoded quantum pulses;
releasing the second encoded quantum pulses towards the second node over the quantum channel;

by the second node:
using said sequence of cipher bits to control said control parameter of said quantum detection process applied to the second encoded quantum pulses received from the first node, the quantum detection process producing a second detection outcome for each received second encoded quantum pulse;
deriving the final cryptographic key by assembling those of the first and second detection outcomes that are binary values into the final cryptographic key.

19. The method defined in claim 18, wherein the final cryptographic key and the initial cryptographic key are identical.

20. The method defined in claim 1, further comprising the first and second nodes communicating at least in part over the quantum channel to derive said sequence of cipher bits.

21. The method defined in claim 20, further comprising the first and second nodes communicating using the BB84 protocol to derive said sequence of cipher bits.

22. The method defined in claim 1, further comprising the first node storing said cipher bits in a memory.

23. The method defined in claim 22, further comprising the second node storing said cipher bits in a memory.

24. A system for quantum key distribution, comprising a first node and a second node;
wherein the first node comprises:
a quantum source for generating a sequence of quantum pulses;
a quantum encoding module for applying a quantum encoding process to the sequence of quantum pulses, thereby to produce a sequence of encoded quantum pulses released towards the second node over a quantum channel, the quantum encoding process being performed on a basis of a pair of control parameters;
a controller operable for:
generating a sequence of key bits forming an initial cryptographic key; and
using said sequence of key bits and a sequence of cipher bits to respectively control the pair control parameters of the quantum encoding process, said sequence of cipher bits being known to the second node;
wherein the second node comprises:
a quantum detection module for applying a quantum detection process to the encoded quantum pulses received from the first node;
a controller operable for:
using said sequence of cipher bits to control a control parameter of the quantum detection process, the quantum detection process producing a detection outcome for each received encoded quantum pulse on a basis of the control parameter; and
deriving a final cryptographic key from the detection outcomes.

25. Apparatus for participating in a key generation process with a receiving node, comprising:
a quantum source for generating a sequence of quantum pulses, each of the quantum pulses potentially having photon content;
a quantum encoding module operable to apply a quantum encoding process to each of the quantum pulses to produce a sequence of encoded pulses, the quantum encoding process placing the photon content of respective ones of the quantum pulses into respective quantum states characterized by respectively associated quantum bases and respectively associated polarities;
a controller operable to generate a sequence of key bits forming a cryptographic key, the controller further operable to supply the sequence of key bits and a sequence of cipher bits to the quantum encoding module, the key bits being representative of said respectively associated polarities, the cipher bits being representative of said respectively associated quantum bases, the cipher having been previously agreed upon with the receiving node;
the quantum encoding module being further operable to release the sequence of encoded quantum pulses towards the receiving node over a quantum channel.

26. Apparatus for participating in a key generation process with a receiving node, comprising:
means for generating a sequence of quantum pulses, each of the quantum pulses potentially having photon content;
means for applying a quantum encoding process to each of the quantum pulses to produce a sequence of encoded pulses, the quantum encoding process placing the photon content of respective ones of the quantum pulses into respective quantum states characterized by respectively associated quantum bases and respectively associated polarities;
means for generating a sequence of key bits forming a cryptographic key, the controller further operable to supply the sequence of key bits and a sequence of cipher bits to the quantum encoding module, the key bits being representative of said respectively associated polarities, the cipher bits being representative of said respectively associated quantum bases, the cipher having been previously agreed upon with the receiving node;
means for releasing the sequence of encoded quantum pulses towards the receiving node over a quantum channel.

27. A method for participating in a key generation process with a receiving node, comprising:
generating a sequence of quantum pulses, each of the quantum pulses potentially having photon content;
applying a quantum encoding process to each of the quantum pulses to produce a sequence of encoded pulses, the quantum encoding process placing the photon content of respective ones of the quantum pulses into respective quantum states characterized by respectively associated quantum bases and respectively associated polarities;
generating a sequence of key bits forming a cryptographic key, the controller further operable to supply the sequence of key bits and a sequence of cipher bits to the quantum encoding module, the key bits being representative of said respectively associated polarities, the cipher bits being representative of said respectively associated quantum bases, the cipher having been previously agreed upon with the receiving node;
releasing the sequence of encoded quantum pulses towards the receiving node over a quantum channel.

28. Apparatus for participating in a key generation process with a transmitting node, comprising:
- a detector for applying a quantum detection function to a sequence of quantum pulses received over a quantum channel to produce a respective plurality of detection outcomes, the quantum detection function processing respective ones of the quantum pulses with respect to respectively associated quantum bases to attempt to detect respective polarities therein, the respective polarities being represented in the detection outcomes;
- a controller operable to supply a sequence of cipher bits to the detector, the cipher bits being representative of said respectively associated quantum bases, the cipher having been previously agreed upon with the transmitting node;
- the controller being further operable to derive a cryptographic key from the detection outcomes.

29. Apparatus for participating in a key generation process with a transmitting node, comprising:
- means for applying a quantum detection function to a sequence of quantum pulses received over a quantum channel to produce a respective plurality of detection outcomes, the quantum detection function processing respective ones of the quantum pulses with respect to respectively associated quantum bases to attempt to detect respective polarities therein, the respective polarities being represented in the detection outcomes;
- means for supplying a sequence of cipher bits to the detector, the cipher bits being representative of said respectively associated quantum bases, the cipher having been previously agreed upon with the transmitting node;
- means for deriving a cryptographic key from the detection outcomes.

30. A method for participating in a key generation process with a transmitting node, comprising:
- applying a quantum detection function to a sequence of quantum pulses received over a quantum channel to produce a respective plurality of detection outcomes, the quantum detection function processing respective ones of the quantum pulses with respect to respectively associated quantum bases to attempt to detect respective polarities therein, the respective polarities being represented in the detection outcomes;
- supplying a sequence of cipher bits to the detector, the cipher bits being representative of said respectively associated quantum bases, the cipher having been previously agreed upon with the transmitting node;
- deriving a cryptographic key from the detection outcomes.

* * * * *